(12) United States Patent
Matsuzaki et al.

(10) Patent No.: US 7,502,071 B2
(45) Date of Patent: Mar. 10, 2009

(54) VIDEO INFORMATION PROCESSING APPARATUS AND VIDEO INFORMATION PROCESSING METHOD

(75) Inventors: Eiichi Matsuzaki, Tokyo (JP); Kenji Inoue, Kanagawa (JP); Takashi Tsunoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 642 days.

(21) Appl. No.: 10/829,196

(22) Filed: Apr. 22, 2004

(65) Prior Publication Data

US 2004/0212732 A1   Oct. 28, 2004

(30) Foreign Application Priority Data

Apr. 24, 2003   (JP)   ............................. 2003-120493

(51) Int. Cl.
- H04N 5/14   (2006.01)
- H04N 7/01   (2006.01)
- H04N 9/64   (2006.01)
- H04N 11/20  (2006.01)

(52) U.S. Cl. ......................... 348/452; 348/448; 348/701
(58) Field of Classification Search ................. 348/452, 348/448, 701, 699–700
See application file for complete search history.

(56) References Cited

U.S. PATENT DOCUMENTS

| | | | | |
|---|---|---|---|---|
| 4,661,853 A * | 4/1987 | Roeder et al. | ............... | 348/701 |
| 4,768,092 A | 8/1988 | Ishikawa | .................... | 358/140 |
| 5,410,356 A | 4/1995 | Kikuchi et al. | .............. | 348/452 |
| 5,943,099 A * | 8/1999 | Kim | .......................... | 348/448 |
| 5,959,681 A * | 9/1999 | Cho | .......................... | 348/452 |
| 6,414,719 B1 * | 7/2002 | Parikh | ........................ | 348/448 |
| 6,621,936 B1 * | 9/2003 | Kondo et al. | ................ | 382/260 |
| 6,636,267 B1 * | 10/2003 | Adachi | ........................ | 348/448 |
| 6,754,371 B1 * | 6/2004 | Kondo et al. | ................ | 382/107 |
| 6,795,123 B2 * | 9/2004 | Gotanda et al. | ............. | 348/448 |

(Continued)

FOREIGN PATENT DOCUMENTS

JP   63-030077   2/1988

(Continued)

OTHER PUBLICATIONS

Patent Abstracts of Japan, vol. 1999, No. 14, Dec. 22, 1999 (JP 11-266439, Sep. 28, 1999).

(Continued)

*Primary Examiner*—Brian P Yenke
(74) *Attorney, Agent, or Firm*—Fitzpatrick, Cella, Harper & Scinto

(57) ABSTRACT

A video information processing apparatus capable of accurately making a motion decision is provided. The apparatus stores interlaced video information for a plurality of fields, generates motion information on each of the pixels contained in a plurality of fields from at least one of the interlaced video information and stored video information, and generates motion information on an interpolation pixel from motion information on pixels contained in the same field as the interpolation pixel among the generated motion information on each of the pixels. The apparatus also generates motion information on the interpolation pixel from motion information on the pixels contained in fields previous and next to the interpolation pixel at the same position as the interpolation pixel, and determines the motion information on the interpolation pixel from the motion information on these pixels.

4 Claims, 15 Drawing Sheets

U.S. PATENT DOCUMENTS

| | | | |
|---|---|---|---|
| 6,822,691 B1 * | 11/2004 | Kim et al. | 348/452 |
| 6,847,405 B2 * | 1/2005 | Hsu et al. | 348/452 |
| 6,859,237 B2 * | 2/2005 | Swartz | 348/700 |
| 7,319,491 B2 * | 1/2008 | Matsuzaki et al. | 348/452 |
| 2001/0015768 A1 * | 8/2001 | Shin et al. | 348/452 |
| 2002/0167503 A1 | 11/2002 | Tsunoda et al. | 345/204 |
| 2003/0007091 A1 | 1/2003 | Nagata | 348/458 |
| 2003/0112369 A1 * | 6/2003 | Yoo et al. | 348/448 |
| 2003/0189674 A1 | 10/2003 | Inoue et al. | 348/738 |
| 2004/0046773 A1 | 3/2004 | Inoue et al. | 345/698 |
| 2004/0189866 A1 * | 9/2004 | Lin et al. | 348/452 |
| 2005/0151878 A1 * | 7/2005 | Kasahara et al. | 348/448 |

FOREIGN PATENT DOCUMENTS

| | | |
|---|---|---|
| JP | 05-207431 | 8/1993 |
| JP | 8-32025 | 2/1996 |
| JP | 10-98692 | 4/1998 |
| JP | 11-266439 | 9/1999 |
| JP | 2000-50212 | 2/2000 |
| JP | 2000-175159 | 6/2000 |
| WO | WO 02/37847 A1 | 5/2002 |

OTHER PUBLICATIONS

Patent Abstracts of Japan, vol. 2000, No. 5, Sep. 14, 2000 (JP 2000-50212, Feb. 18, 2000).

Feb. 15, 2005 European Search Report in EP 04009719.

* cited by examiner

EVEN FIELDS

ODD FIELDS

FRAMES

VIDEO INFORMATION
ON FIELD OF INTEREST

VIDEO INFORMATION
WHICH IS ONE FIELD
PERIOD PREVIOUS

VIDEO INFORMATION
WHICH IS TWO FIELD
PERIODS PREVIOUS

VIDEO INFORMATION
WHICH IS THREE FIELD
PERIODS PREVIOUS

MOTION INFORMATION
ON FIELD OF INTEREST

MOTION INFORMATION
WHICH IS ONE FIELD
PERIOD PREVIOUS

MOTION INFORMATION
WHICH IS ONE FIELD
PERIOD LATER

VIDEO INFORMATION
ON FIELD OF INTEREST

VIDEO INFORMATION
WHICH IS ONE FIELD
PERIOD PREVIOUS

VIDEO INFORMATION
WHICH IS TWO FIELD
PERIODS PREVIOUS

VIDEO INFORMATION
WHICH IS THREE FIELD
PERIODS PREVIOUS

MOTION INFORMATION
ON FIELD OF INTEREST

MOTION INFORMATION
WHICH IS ONE FIELD
PERIOD PREVIOUS

MOTION INFORMATION
WHICH IS ONE FRAME
PERIOD PREVIOUS

MOTION INFORMATION
WHICH IS ONE FRAME
PERIOD LATER

VIDEO INFORMATION PROCESSING APPARATUS AND VIDEO INFORMATION PROCESSING METHOD

BACKGROUND OF THE INVENTION

1. Field of the Invention

The present invention relates to a video information processing apparatus and a video information processing method both of which convert interlaced video information into progressive video information in television.

2. Description of the Related Art

In recent years, the transition from existing analog television systems to digital television systems has started to be considered. Owing to new technological innovations called digitization, television broadcasting is growing into to a far advanced information communications medium, and is making far more rapid progress. In Japan as well, digitization has already been realized in broadcasting using a CS (Communication Satellite) and broadcasting using a BS (Broadcasting Satellite). In addition, digitization of ground-wave broadcasting is currently being considered, and in the near future, all broadcasting waves will change to digital waves.

A great merit of digital television broadcasting is that a digital system can transmit three channels of programs with a frequency band corresponding to one channel in an analog system, so that multiple channels can be provided. Accordingly, it is possible to realized new services such as multiple programs (mixed multiple organized programs) in which news, sports, dramas and the like are combined, and multichannel broadcasting in which three different programs are broadcasted in one channel.

Furthermore, digital television broadcasting enables broadcasting of not only video and audio but also integrated broadcasting services containing various kinds of data broadcasting. Services containing various kinds of data broadcasting are divided into types which provide multimedia-like services by adding data information to television programs and types which provide services independent of television programs. As main services, audience-participation programs, home shopping, various information services, and weather forecasts and news which can be watched at any time.

To cope with this digital television broadcasting, receivers for television broadcasting are also making progress, and flat-panel large-sized plasma displays have been provided. In addition, existing cathode-ray tube types of television receivers having high-definition resolution for digital television broadcasting have been provided. In these display devices, video display is performed not by existing interlaced scanning which scans every other line, but by progressive scanning. Accordingly, in the case where an existing analog television broadcast is displayed, interlaced video information is converted into progressive video information (hereinafter referred to as IP (Interlace-Progressive) conversion), and the resolution of the video information is converted to the resolution of a display device so that the video information is visually displayed.

The following is a brief description of a related-art IP conversion processing circuit. FIG. 9 is a block diagram showing the construction or a related-art general IP conversion processing circuit In FIG. 9, reference numerals 101 and 102 denote field information storage units which store inputted video information in units of fields. Reference numeral 103 denotes a motion detector-generator. This motion detector-generator 103 finds the difference between the currently inputted field information and field information which is outputted from the field information storage unit 102 and was inputted one frame period previously to the currently inputted field information, thereby determining in units of pixels whether the input video information is moving-image information or still-image information. Furthermore, the motion detector-generator 103 determines the motion of an interpolation pixel, from the obtained motion information on each pixel, and outputs the determined motion.

Reference numeral 104 denotes a line information storage unit which stores the inputted video information in units of lines. Reference numeral 107 denotes an adder which performs addition on two inputted signals Reference numeral 108 denotes a divider which finds the half value of the sum of values added by the adder 107. Reference numeral 109 denotes an interpolation information selecting unit. The interpolation information selecting unit 109 selects, according to the output signal from the motion detector-generator 103, either pixel information which is outputted from the field information storage unit 101 and was inputted one field period previously to the currently inputted field information, or an average value of pixel values which is outputted from the divider 108 and contained in lines above and below an interpolation pixel position, and determines the selected information as an interpolation pixel value.

Reference numeral 105 denotes an input-output conversion speed unit for storing the pixel information outputted from the interpolation information selecting unit 109 in units of lines and reading out the stored pixel information at a speed twice that of the inputted video information, while reference numeral 106 denotes an input-output conversion speed unit for storing the inputted pixel information in units of lines and reading out the stored pixel information at a speed twice that of the inputted video information. Reference numeral 110 denotes a display information selecting unit which outputs pixel information while effecting line-by-line switching between the pixel information outputted from the input-output conversion speed unit 105 and the pixel information outputted from the input-output conversion speed unit 106.

The operation of the related-art IP conversion processing circuit will be described below. Inputted interlaced video information is inputted to the field information storage unit 101 and to the line information storage unit 104, and pixel information which is delayed by one field period is obtained from the field information storage unit 101, while pixel information which was inputted one line previously is obtained from the line information storage unit 104.

FIGS. 10A to 10C are views showing video information displayed by interlace scanning of the NTSC (national television system committee) signal. In FIG. 10A, in the NTSC signal, one picture is made of 525 horizontal lines, and the unit of this one picture is called a frame. The frame is divided into an odd field in which odd lines are represented by interlace scanning as shown in FIG. 10B and an even field in which even lines are represented by interlace scanning as shown in FIG. 10C. In the NTSC signal, 525 lines of video information are represented by alternately displaying the odd field of video and the even field of video. Namely, the odd field and the even field are in the relationship of mutual interpolation of their shortages of line information.

Accordingly, the previous field of pixel information corresponding to the position of a pixel to be interpolated is obtained from the field information storage unit 101. In addition, pixel information contained in lines above and below the pixel to be interpolated is obtained from the inputted video information as well as from the line information storage unit 104. Furthermore, the average value of the pixel information contained in the lines above and below the pixel to be interpolated is found from the inputted video information and the line information storage unit 104 by the adder 107 and the divider 108, and is used as interpolation pixel information for a moving image.

The pixel information outputted from the field information storage unit 101 is further one field period delayed by the field information storage unit 102, whereby video information delayed by one frame period from the inputted video information, i.e., pixel information contained in the previous frame corresponding to the position of the inputted pixel is obtained.

The motion detector-generator 103 will be described below. FIG. 11 is a block diagram showing the construction of the motion detector-generator 103. In FIG. 11, reference numeral 1031 denotes a subtracter which finds the difference between the currently inputted field information and the field information which is outputted from the field information storage unit 102 and was inputted one frame period previously to the currently inputted field information.

Reference numeral 1032 denotes an absolute-value unit which finds the absolute value of the difference value found by the subtracter 1031. Reference numeral 1033 denotes a threshold filter circuit which compares the value found by the absolute-value unit 1032 and a preset threshold. If the value found by the absolute-value unit 1032 is smaller than the threshold, the threshold filter circuit 1033 determines that the pixel is a still-image pixel, and outputs the value "0". On the other hand, if the value found by the absolute-value unit 1032 is greater than or equal to the threshold, the threshold filter circuit 1033 determines that the pixel is a moving-image pixel, and output the value "1". Accordingly, even if invalid pixel information such as noise is added to the inputted video information, the threshold filter circuit 1033 can eliminate the influence as long as the invalid pixel information is a small variation.

Reference numeral 1034 denotes a line motion information storage unit which stores in units of lines motion information on each pixel outputted from the threshold filter circuit 1033. Motion information on a pixel which was inputted one line previously to the inputted video information can be obtained from the line motion information storage unit 1034.

Reference numeral 1035 denotes a two-input one-output OR element which finds the logical sum of the motion information outputted from the threshold filter circuit 1033 and the motion information on the pixel which is one line previous and is outputted from the line motion information storage unit 1034, thereby determining motion information on an interpolation pixel and outputting the motion information.

If the motion information outputted from the motion detector-generator 103 is the value "0", the interpolation information selecting unit 109 selects the pixel information outputted from the field information storage unit 101, whereas in the case of the value "1", the interpolation information selecting unit 109 selects the pixel information outputted from the divider 108 and outputs the pixel information as interpolation pixel information.

The input-output conversion speed unit 105 and the input-output conversion speed unit 106 respectively store in units of lines the interpolation pixel information outputted from the interpolation information selecting unit 109 and the inputted video information. The stored pixel information is read at a speed twice that of the inputted video information, and the display information selecting unit 110 outputs the pixel information while effecting line-by-line switching between the pixel information outputted from the input-output conversion speed unit 105 and the pixel information outputted from the input-output conversion speed unit 106.

However, in the above-mentioned related-art IP conversion method, since the difference information between frames is used for the detection of motion information, if a motion occurs in a field between frames, the moving image is determined as a still image, so that erroneous data is set as an interpolation pixel value.

In addition, in the case where invalid pixel information is added by the influence of noise and the like and motion information cannot be accurately detected, switching frequently occurs between interpolation pixel information indicative of a moving image and interpolation pixel information indicative of a still image, so that a remarkable image quality degradation occurs in video.

To cope with these problems, several proposals have already been made. For example, to solve the erroneous detection caused when a motion occurs in a field between frames, JP-B-8-32025 and JP-A-2000-175159 disclose means for referring to motion information on the previous field as well. In addition, to solve the erroneous detection due to the influence of noise and the like, JP-A-10-98692 discloses means for referring to motion information on the previous frame as well. This method of referring to motion information on a previous field or frame in this manner is means useful for preventing erroneous detection of motion information.

However, as in the case of the above-mentioned related arts, only if motion information on a previous field or frame is simply referred to, new erroneous detection is likely to be incurred. The following is a description of such a case.

FIGS. 12A to 12D are views showing an example in which the letter "H" is displayed while travelling in the horizontal direction from right to left. FIG. 12A shows the display state of video information on a field of interest, FIG. 12B shows the display state of video information on a field which is one field period previous to the field shown in FIG. 12A, FIG. 12C shows the display state of video information on a field which is another one field period previous to the field shown in FIG. 12A, and FIG. 12D shows the display state of video information on a field which is yet another one field period previous to the field shown in FIG. 12A.

In the related-art motion detection method, since motion information is detected by finding the difference between frames, motion information indicative of the display state of FIG. 12A is obtained by comparing the display state of FIG. 12A and the display state of FIG. 12C. FIGS. 13E to 13G are views motion information in individual fields. Consequently, as shown in. FIG. 13E, the display state of "H" shown in FIG. 12A and the display state of "H" shown in FIG. 12C are obtained as motion information.

Similarly, the motion information indicative of the display state of FIG. 12B which corresponds to the field which is one field period previous results as shown in FIG. 13F. Motion information on the next to the field shown in FIG. 12A results as shown in FIG. 13G. In this method, since the motion information is detected between frames, the motion information on the field of interest lacks, as shown in FIG. 13E, the motion information indicative of the display state of FIG. 12B which corresponds to a field between frames.

For this reason, as disclosed in JP-B-8-32025 and JP-A-2000-175159, motion information on the previous field, i.e., the motion information shown in FIG. 13F is also used as the motion information indicative of the display state shown in FIG. 12A, whereby it is possible to avoid this detection leakage. As mentioned above, to refer to motion information in the previous field as well is means useful in preventing erroneous detection of motion information.

However, the motion information necessary for the display state shown in FIG. 12A is information indicating at which location the state of a pixel has varied from the display state which is one frame period previous. Namely, the variations of the motion shown in FIGS. 12A to 12C need only be detected. However, if the motion information shown in FIG. 13F, which is motion information which is one field period previous, is used without modification, motion information which is three field periods previous, i.e., the motion information indicative of the display state of FIG. 12D, will be contained. Consequently, a portion which should be processed as a still image is processed as a moving image.

In the above-mentioned related-art IP conversion method, if that portion is processed as a moving image, an average value of pixel values positioned lines above and below in the same field is found as an interpolation pixel value, so that there is the disadvantage that the vertical spatial frequency is reduced to half, resulting in unsharp video images. For this reason, in order to maintain the vertical spatial frequency, it is preferable to process the portion as a still image as positively as possible and use a pixel value of the previous field as an interpolation pixel value. From this point of view, even when motion information on the previous field is to be used, the avoidance of use of motion information relative to unnecessary motion will lead to prevention of degradation of image quality.

FIGS. 14H to 14k are views showing an example in which the letter "H" is displayed while travelling in the horizontal direction from right to left. FIG. 14H shows the display state of video information on a field of interest, FIG. 14I shows the display state of video information on a field which is one field period previous to the field shown in FIG. 14H, FIG. 14J shows the display state of video information on a field which is another one field period previous to the field shown in FIG. 14H, and FIG. 14K shows the display state of video information on a field which is yet another one field period previous to the field shown in FIG. 14H If the related-art motion detection method is used for these display states, motion information indicative of the display state of FIG. 14H is obtained by comparing the display state of FIG. 14H and the display state of FIG. 14J. Consequently, the motion information shown in FIG. 15M is found. FIGS. 15M to 15Q are views showing motion information on individual fields.

In the case of these display states, referring to the state of the letter which has traveled from the display state of FIG. 14J to the display state of FIG. 14H, an overlapping portion exists between the position of the letter "H" in the display state of FIG. 14J and the position of the letter "H" in the display state of FIG. 14H, and motion information on the overlapping portion is handled as a still image. Although this portion in which the overlap of the letters has occurred must be originally handled as a moving image, the motion information is erroneously detected. Similarly, motion information indicative of the display state of FIG. 14I which is one field period previous results as shown in FIG. 15N.

In this case, erroneous detection information is contained in the motion information itself, so that accurate motion information on an interpolation pixel cannot be found. Furthermore, if motion information containing this erroneous detection information is used as motion information on the previous field as mentioned above in connection with FIGS. 12A to 13G, it becomes impossible to completely remedy erroneous detection. Accordingly, if more accurate motion information on an interpolation pixel is to be found, it is necessary to take measures against erroneous detection such as those shown in FIGS. 14H to 15Q and use the obtained information as motion information on the previous field. This erroneous detection cannot be avoided merely by referring to motion information on previous fields such as those shown in FIGS. 12A to 13G.

In the above description, reference has been made to the fact that erroneous detection of motion information which is caused by finding difference information between frames cannot be solved by simply referring to moving image on previous fields. However, even in the case where motion information on previous frames are referred to in order to reduce the influence of noise and the like, if similar erroneous detection information is contained in the motion information on the previous frames, no sufficient effect can be expected.

SUMMARY OF THE INVENTION

The invention provides a video information processing apparatus which detects motions in fields between frames without incurring new erroneous detection and further can prevent erroneous detection in which a portion to be originally processed as a moving image is processed as a still image when pixel information on a moving image is the same as pixel information on the previous frame, thereby making it possible to accurately make a motion decision.

Therefore, the invention provides a video information processing apparatus which receives interlaced video information, finds motion information on an interpolation pixel, and when the found motion information on the interpolation pixel is a still image, determines, as interpolation pixel information, pixel information found at the same position as the interpolation pixel in a field previous to a field containing the interpolation pixel, or when the found motion information on the interpolation pixel is a moving image, generates interpolation pixel information from pixel information found in the field containing the interpolation pixel and converts the interlaced video information into progressive video information. The video information processing apparatus includes: video information storing means for storing the inputted interlaced video information for a plurality of fields; reference pixel motion information generating means for generating motion information on each pixel of the plurality of fields from at least either one of the inputted interlaced video information and the video information stored in the video information storing means; intrafield interpolation pixel motion information generating means for generating motion information on the interpolation pixel from motion information on pixels contained in the same field as the interpolation pixel, from among the motion information on each pixel generated by the reference pixel motion information generating means; interfield interpolation pixel motion information generating means for generating motion information on the interpolation pixel from motion information on pixels contained in fields previous and next to the interpolation pixel at the same position as the interpolation pixel, from among the motion information on each pixel generated by the reference pixel motion information generating means; interpolation pixel motion determining means for determining motion information on the interpolation pixel from the motion information on the interpolation pixel generated by the intrafield interpolation pixel motion information generating means and from the motion information on the interpolation pixel generated by the interfield interpolation pixel motion information generating means; and selecting means for selecting, according to the motion information on the interpolation pixel determined by the interpolation pixel motion determining means, either one of the pixel information found at the same position as the interpolation pixel in the field previous to the field containing the interpolation pixel and the pixel information generated from the pixel information found in the field, and determining the selected one as the interpolation pixel information.

BRIEF DESCRIPTION OF THE DRAWINGS

FIGS. 15M to 15Q are views showing motion information on individual fields.

DETAILED DESCRIPTION OF THE PREFERRED EMBODIMENTS

Preferred embodiments of a video information processing apparatus according to the invention will be described below with reference to the accompanying drawings. A video information processing apparatuses according to the present embodiments is applied to an IP conversion processing circuit.

First Embodiment

Figure 12A:
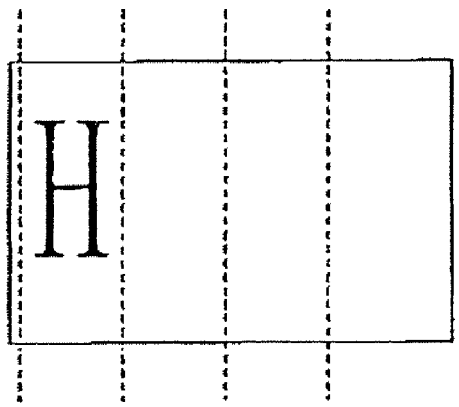
FIGS. 12A to 12D are views showing an example in which the letter "H" is displayed while travelling in the horizontal direction from right to left.
Figure 12B:
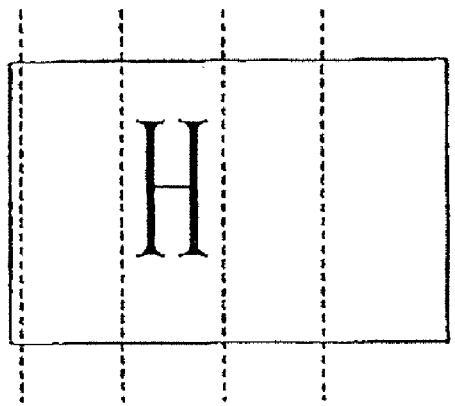
Figure 12C:
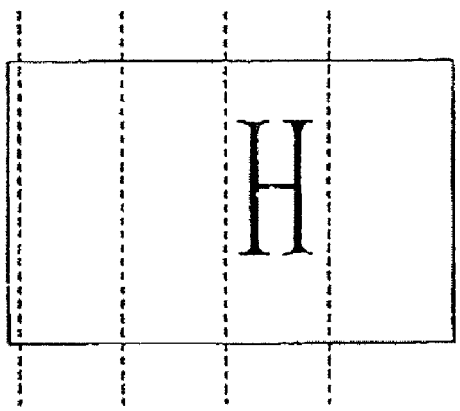
Figure 12D:
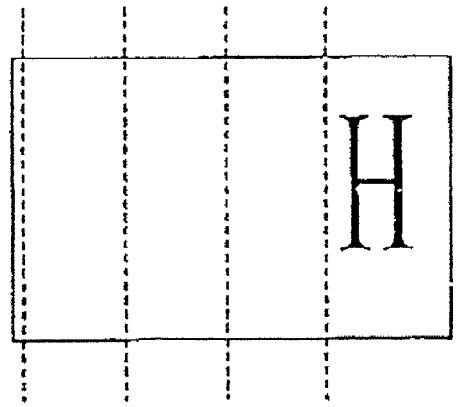
Figure 13E:
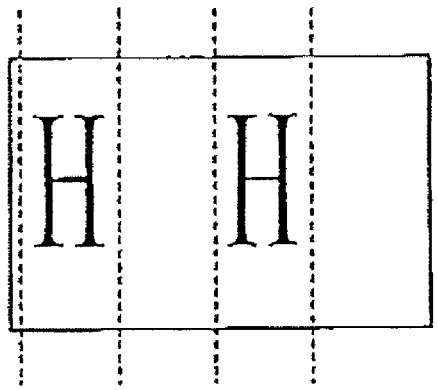
FIGS. 13E to 13G are views motion information in individual fields.
Figure 13F:
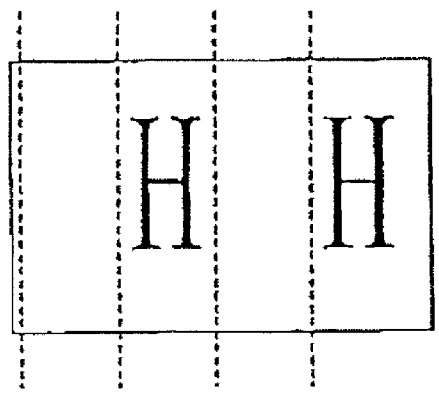
Figure 13G:
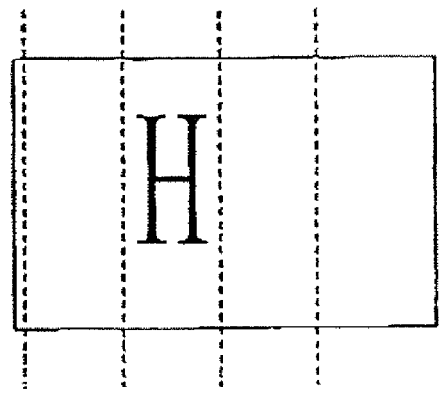

In the following description of the first embodiment, reference will be made to the case where motion information on fields between frames is to be detected as shown in FIGS. 12A to 12D and 13E to 13G mentioned previously, without incurring new erroneous detection. As can be seen from FIGS. 13F and 13G, the display state of the motion information which is one field period previous as shown in FIG. 12B and cannot be detected from an interframe difference signal during the display state shown in FIG. 13E is detected as moving images in the previous and next fields. Accordingly, when motion information on a field of interest is to be determined, motion information on each of the previous and next fields is also be referred to, and even if the motion information on the field of interest is still-image information, when the motion information on each of the previous and next fields is moving-image information, the motion information on that pixel is handled as moving-image information, whereby the motion information on the field between frames can be detected as moving-image information.

Figure 1:
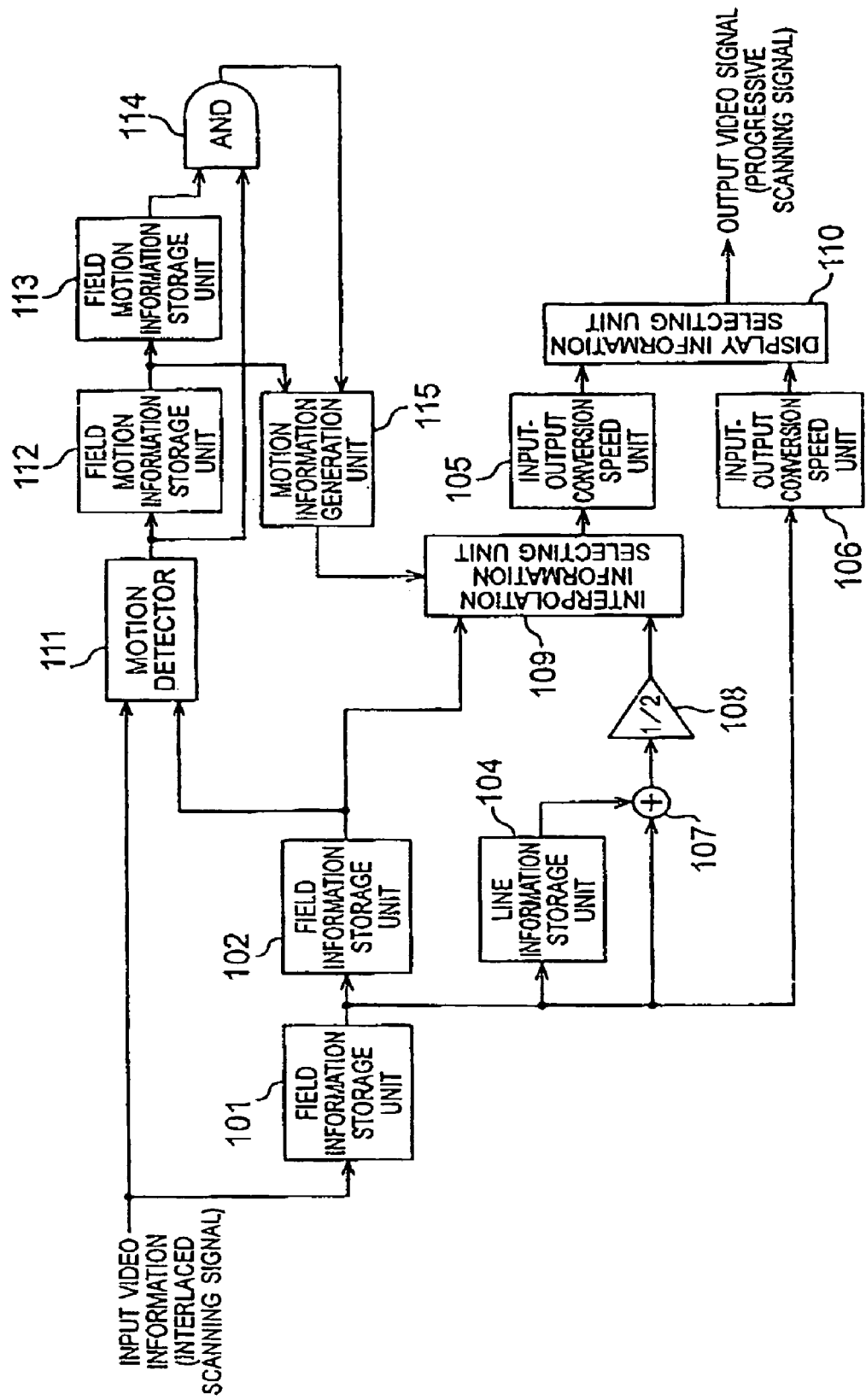
FIG. 1 is a block diagram showing the construction of an IP conversion processing circuit according to a first embodiment.
Figure 11:
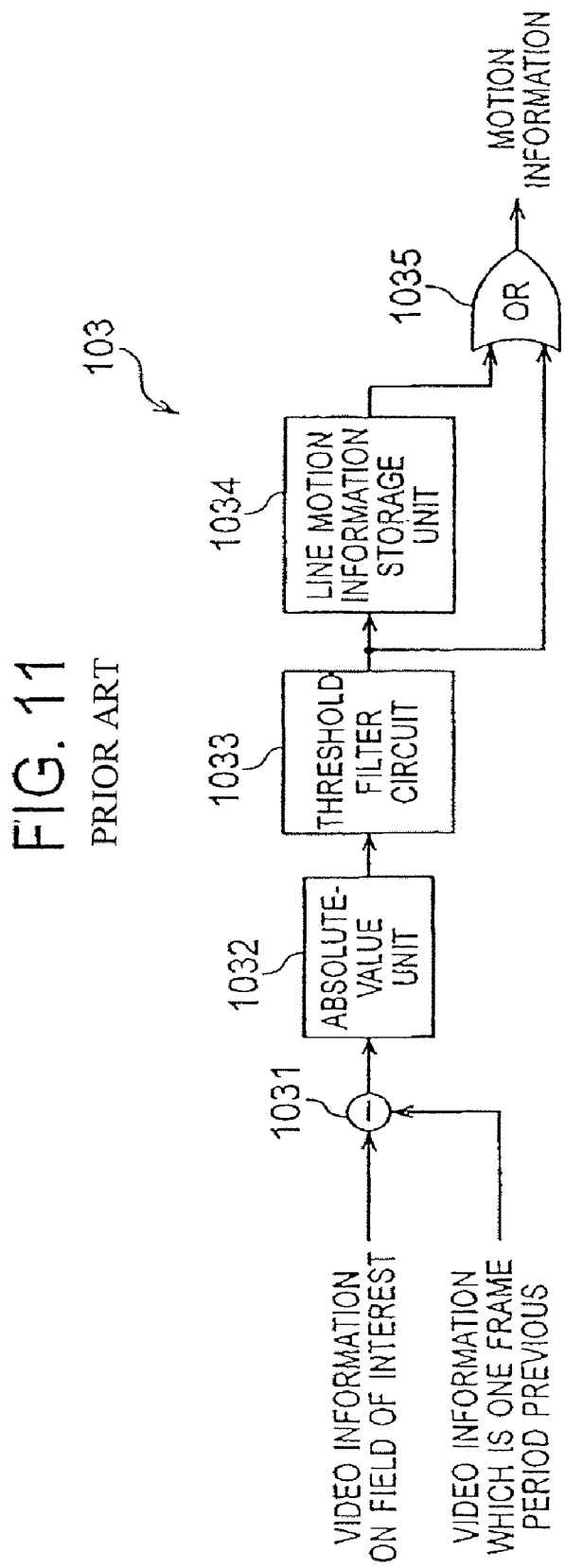
FIG. 11 is a block diagram showing the construction of a motion detector-generator 103.

FIG. 1 is a block diagram showing the construction of an IP conversion processing circuit according to the first embodiment. In FIG. 1, reference numeral 111 denotes a motion detector which detects the presence or absence of a motion in units of pixels. The motion detector 111 includes the subtracter 1031, the absolute-value unit 1032 and the threshold filter circuit 1033 which are included in the related-art motion detector-generator 103 (refer to FIG. 11). The subtracter 1031 finds the difference value between video information on a field of interest and video information which was inputted one frame period previously to that field. The absolute-value unit 1032 finds the absolute value of the difference value found by the subtracter 1031. The threshold filter circuit 1033 determines from the output information of the absolute-value unit 1032 whether the inputted video information is a moving image or a still image, and outputs the value "1" in the case of a moving image or the value "0" in the case of a still image. Accordingly, motion information on each inputted pixel is outputted from the motion detector 111.

Figure 9:
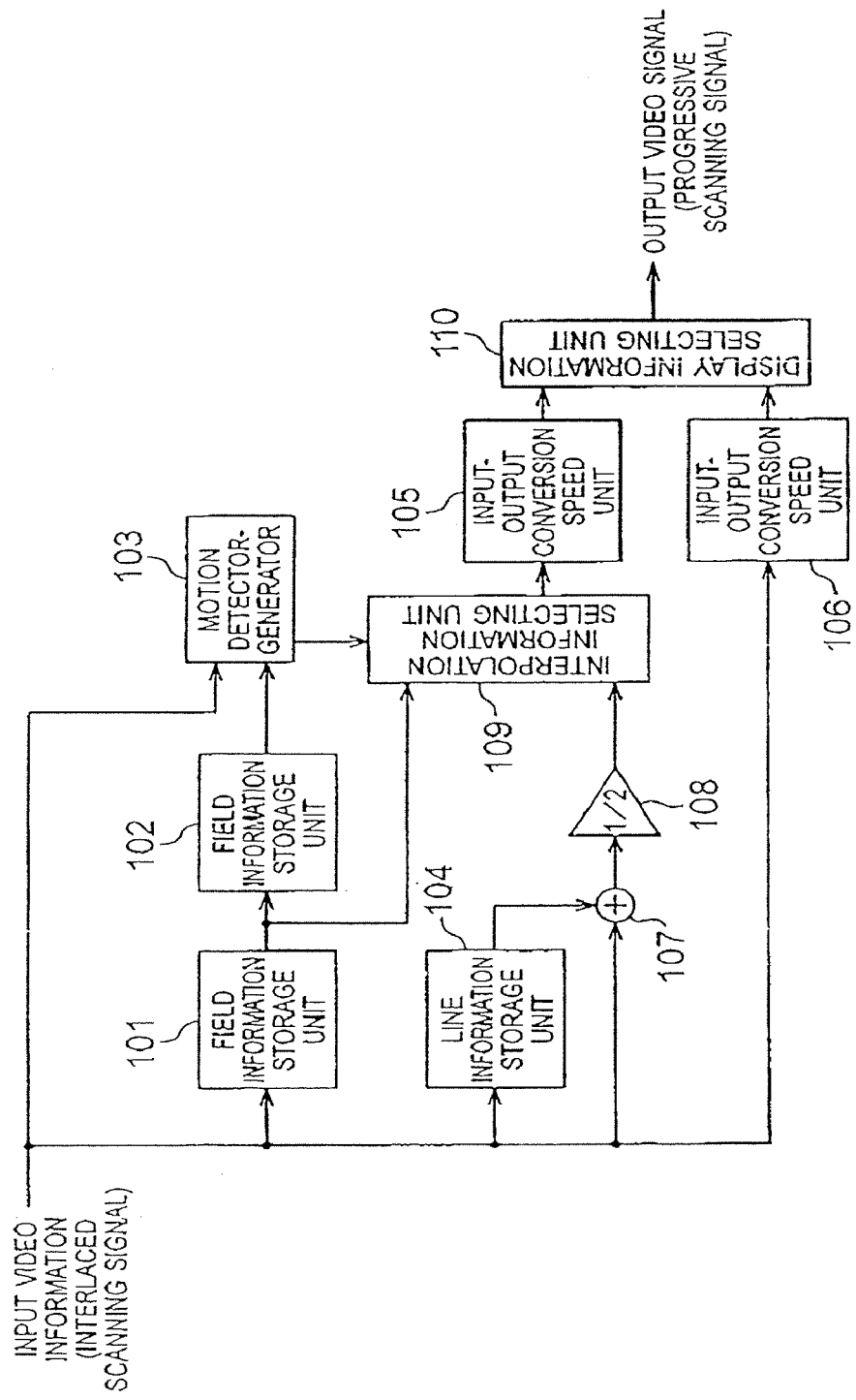
FIG. 9 is a block diagram showing the construction of an existing general IP conversion processing circuit.
Figure 10C:
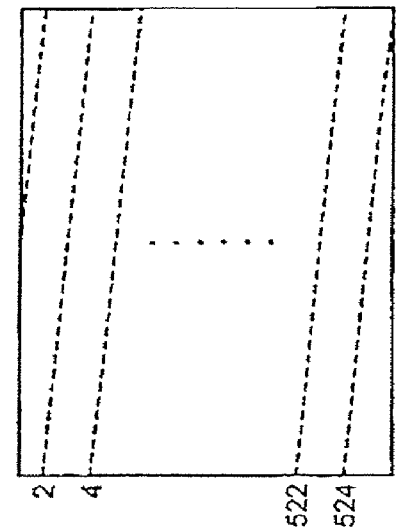
FIGS. 10A to 10C are views showing video information displayed by interlace scanning of the NTSC (national television system committee) signal.
Figure 10B:
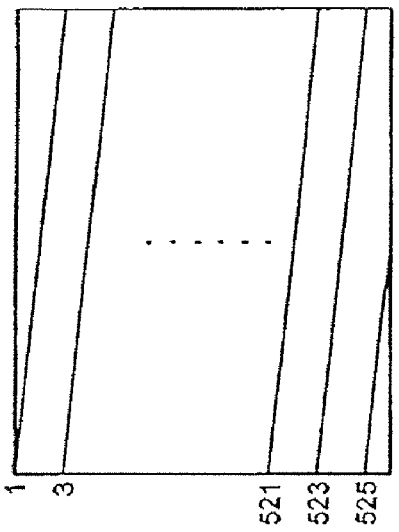
Figure 10A:
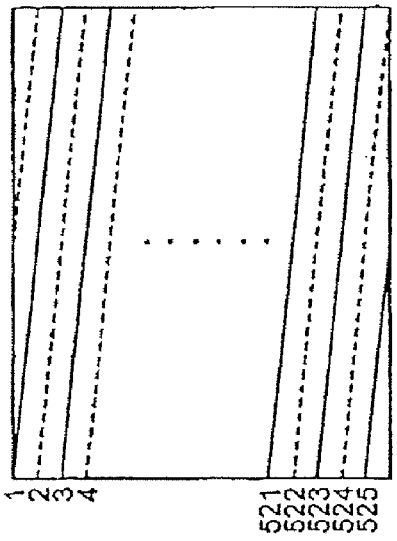

Reference numerals 112 and 113 respectively denote field motion information storage units which store in units of fields the motion information on each pixel outputted from the motion detector 111. Reference numeral 114 denotes a two-input one-output AND device. Reference numeral 115 denotes a motion information generation unit which determines final motion information on a pixel to be interpolated, from motion information on a plurality of inputted fields. The other constituent units are the same as the corresponding ones of the related-art IP conversion processing circuit shown in FIG. 9, and the description of the same units is omitted.

The operation of the IP conversion processing circuit having the above-mentioned construction will be described below. The motion detector 111 finds motion information on the inputted field by comparing the inputted video information and video information which is outputted from the field information storage unit 102 and is delayed by one frame period from the inputted video information. The motion information found by the motion detector 111 is stored in units of fields into each of the field motion information storage units 112 and 113. Consequently, motion information which is one field period previous to the inputted field is outputted from each of the field motion information storage units 112 and 113.

Figure 2:
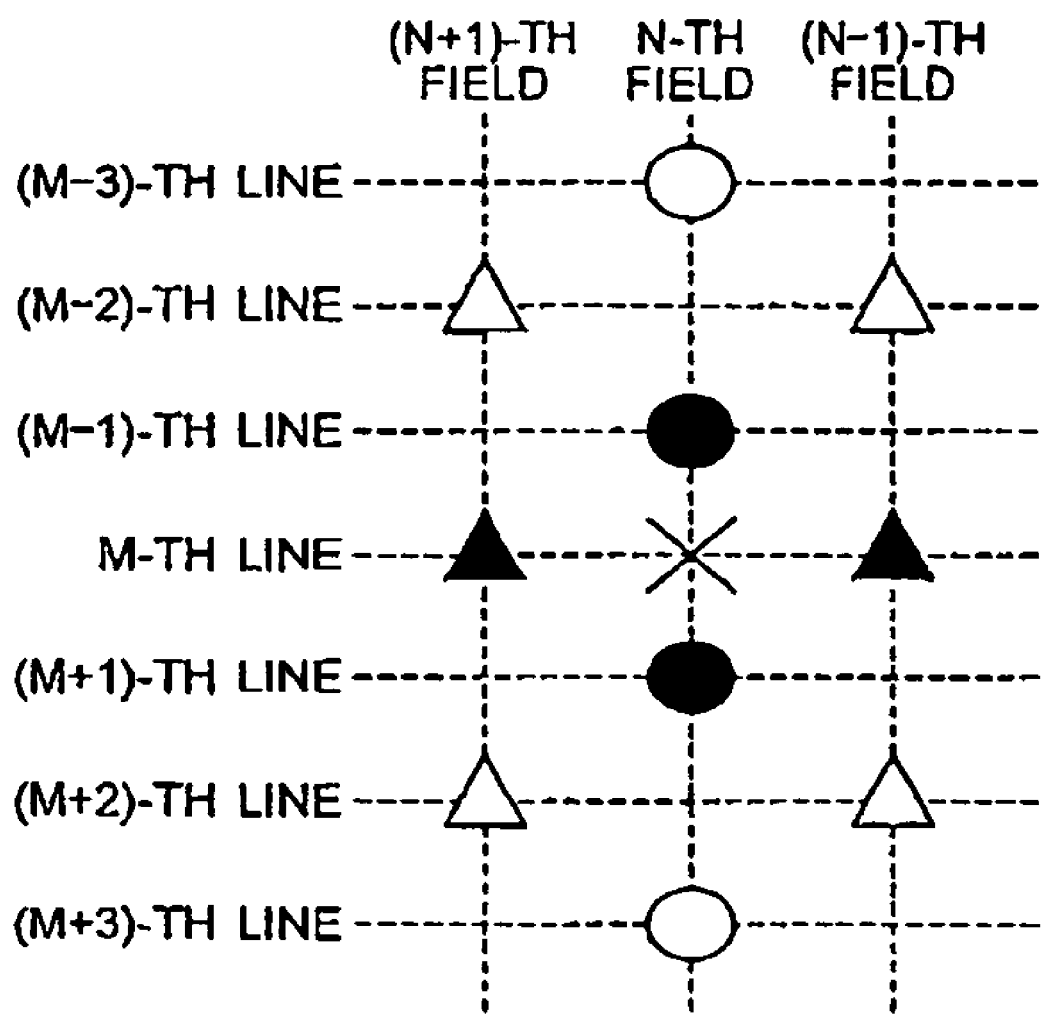
FIG. 2 is a view showing the relationship between the position of a pixel to be interpolated and the positions of pixels which neighbor the position of the interpolation pixel and have motion information to be referred to for the purposes of determining the motion of the interpolation pixel, as well as the positions of pixels which are contained in the previous and next fields and have motion information to be referred to for the same purposes.

FIG. 2 is a view showing the relationship between the position of a pixel to be interpolated and the positions of pixels which neighbor the position of the interpolation pixel and have motion information to be referred to for the purposes of determining the motion of the interpolation pixel, as well as the positions of pixels which are contained in the previous and next fields and have motion information to be referred to for the same purposes In FIG. 2, the symbol "x" denotes a pixel of interest to be interpolated. The symbols "○" and "●" denote input pixels of an odd field. The symbols "Δ" and "▲" denote input fields of even fields. The symbols "●" and "▲" denote pixels having motion information to be referred to when the motion of the pixel of interest to be interpolated is to be determined. In FIG. 2, a field which contains the pixel to be interpolated is assumed to be the n-th field which is an odd field. In addition, the pixel to be interpolated is assumed to be positioned on the m-th line of a frame.

Namely, video information on the (n+1)-th field is inputted as input video information, and the motion detector 111 finds motion information on the pixels of the (n+1)-th field from the inputted video information on the (n+1)-th field and video information on the (n−1)-th field outputted from the field information storage unit 102.

In addition, motion information on the pixels of the n-th field which has previously been found by the motion detector 111 is outputted from the field motion information storage unit 112, while motion information on the pixels of the (n−1)-th field which is one field previous to the n-th field is outputted from the field motion information storage unit 113.

The motion information on the pixels of the (n+1)-th field which has been outputted from the motion detector 111 and the motion information on the pixels of the (n−1)-th field which has been outputted from the field motion information storage unit 113 are inputted to an AND device 114, and information indicative of the logical product of the motion information on these pixels is obtained from the AND device 114. Namely, if the motion information on the (n−1)-th field is the value "1" and the motion information on the (n+1)-th field is the value "1", it is determined that a motion of the pixel to be interpolated has occurred, and the value "1" is outputted from the AND device 114. In this description, since motion information on the interpolation pixel positioned on the m-th line of the n-th field is to be found, information indicative of the logical product of motion information on a pixel positioned on the m-th line of the (n+1)-th field and motion information on a pixel positioned on the m-th line of the (n−1)-th field is outputted from the AND device 114.

Figure 3:
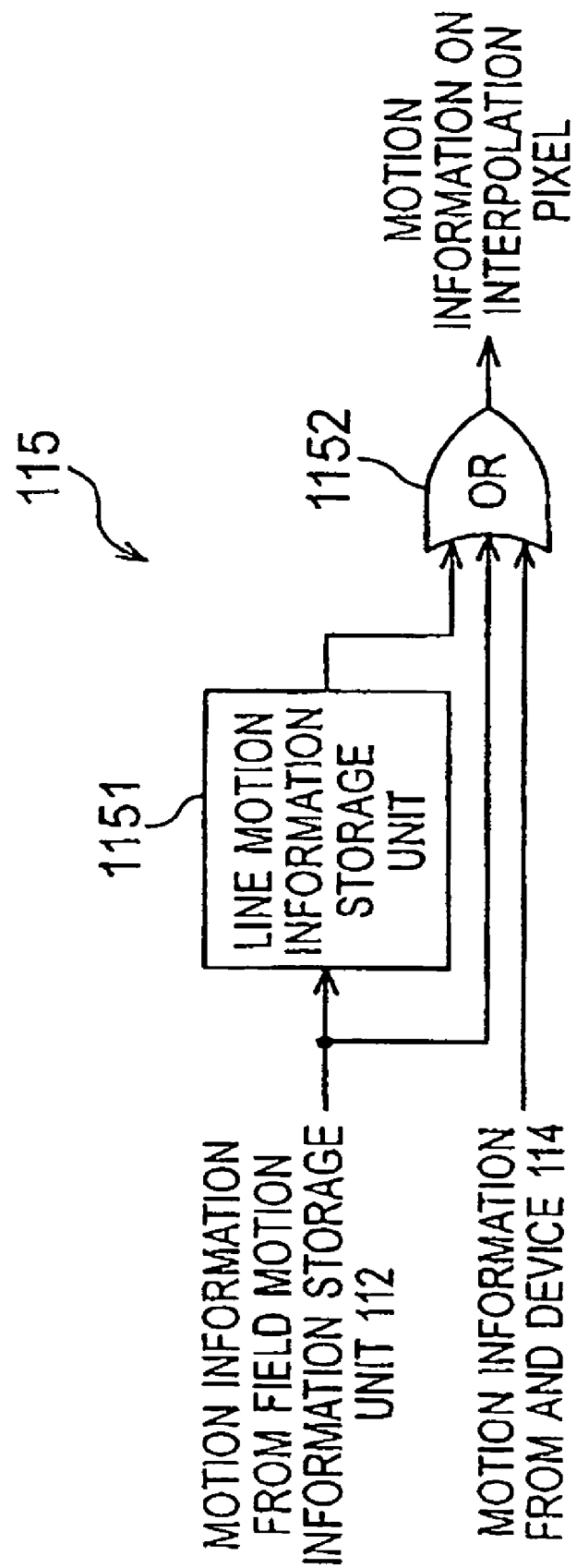
FIG. 3 is a view showing the construction of a motion information generation unit 115.

The motion information generation unit 115 determines final motion information on the interpolation pixel from the motion information on the n-th field outputted from the field motion information storage unit 112 and the motion information on the n-th field outputted from the AND device 114. FIG. 3 is a view showing the construction of the motion information generation unit 115. In FIG. 3, reference numeral 1151 denotes a line motion information storage unit which stores in units of lines the inputted motion information, and reference numeral 1152 denotes a three-input one-output OR device.

The motion information on the n-th field outputted from the field motion information storage unit 112 is inputted to the line motion information storage unit 1151. Then, motion information on a pixel which was processed one line period previously is outputted from the line motion information storage unit 1151. Namely, assuming that motion information on a pixel positioned on the (m+1)-th line of the n-th field is outputted from the field motion information storage unit 112, motion information on a pixel positioned on the (m−1)-th line in the n-th field is outputted from the line motion information storage unit 1151.

Inputted to the OR device 1152 are: motion information on an interpolation pixel which has been found from motion information on the pixels positioned in the fields previous and next to the pixel to be interpolated; motion information on a pixel positioned on the next line in the same field as the pixel to be interpolated, which information is outputted from the field motion information storage unit 112; and motion information on a pixel positioned on the previous line in the same field as the pixel to be interpolated, which information is outputted from a line motion information storage unit 1151. The logical sum of the motion information on these pixels is outputted from the OR device 1152. Namely, if it is determined that any one of the three pieces of inputted motion information is a moving image, motion information indicative of a moving image is outputted from the OR device 1152, whereas if it is determined that each of the three pieces of inputted motion information is a still image, motion information indicative of a still image is outputted from the OR device 1152.

In this description, since the video information on the (n+1)-th field is assumed to be inputted, the motion information on the interpolation pixel in the n-th field is outputted from the motion information generation unit 115. Accordingly, the pixel information on the (n−1)-th field which is outputted from the field information storage unit 102 is inputted to the interpolation information selecting unit 109 as pixel information which was inputted one field period previous to the field to be interpolated.

In addition, in order to obtain from the divider 108 an average value of the pixel values on the lines above and below the interpolation pixel position, the pixel information on the n-th field which is outputted from the field information storage unit 101 is inputted to the line information storage unit 104 and to the adder 107. The average value of the pixel values on the lines above and below the interpolation pixel position, which is obtained from the divider 108, is inputted to the interpolation information selecting unit 109.

The interpolation information selecting unit 109 selects, according to the motion information on the interpolation pixel which is outputted from the motion information generation unit 115, either one of the motion information on the (n−1)-th field which is outputted from the field information storage unit 102 and the average value of the pixel values on the lines above and below the interpolation pixel position which is outputted from the divider 108, and outputs the selected one to the input-output conversion speed unit 105.

The pixel information on the n-th field which is outputted from the field information storage unit 101 is inputted to the input-output conversion speed unit 106. The pixel information inputted to the input-output conversion speed unit 105 and the pixel information inputted to the input-output conversion speed unit 106 are read out at speeds twice their input speeds, respectively. The display information selecting unit 110 effects line-by-line switching between the pixel information outputted from the input-output conversion speed unit 105 and the pixel information outputted from the input-output conversion speed unit 106, and outputs the resultant pixel information as a progressive video signal.

Figure 4:
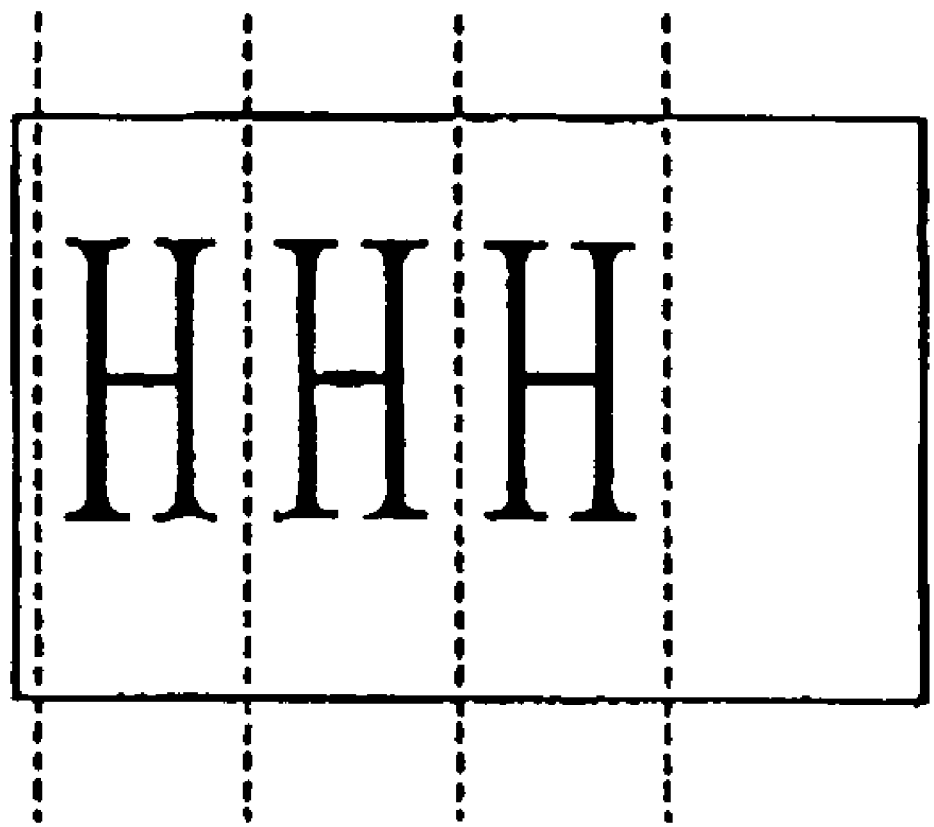
FIG. 4 is a view showing motion information on a field of interest.

Consequently, the motion information on the field of interest shown in FIG. 12A mentioned above is obtained as motion information which accurately represents the states of motion of the respective fields shown in FIGS. 12A, 12B and 12C, as shown in FIG. 4. FIG. 4 is a view showing the motion information on the field of interest.

According to the IP conversion processing circuit of the first embodiment, when motion information on a pixel to be interpolated is to be determined, the presence or absence of motion of the interpolation pixel is, as in the case of the related art, determined from motion information on pixels contained in lines above and below the interpolation pixel in the same field, and the presence or absence of motion of the interpolation pixel is also determined from motion information on pixels contained in the previous and next fields at the same position as the interpolation pixel. Accordingly, the IP conversion processing circuit of the first embodiment can detect motions in fields between frames such as those shown in FIGS. 12A to 13G without incurring new erroneous detection.

In the first embodiment, motion information on a plurality of fields are obtained at the same time by storing in units of fields the motion information found by the motion detector 111 into the field motion information storage unit 112 and into the field motion information storage unit 113. Instead of the field motion information storage unit 112 and the field motion information storage unit 113, a plurality of field information storage units and motion detectors may be provided so that motion information on a pixel of interest fields can be found at each time. In this construction as well, it is possible to obtain an advantage similar to that of the first embodiment.

Second Embodiment

In the above description of the first embodiment, reference has been made to the case where when motion information on a pixel to be interpolated is to be determined, the presence or absence of motion of the interpolation pixel is, as in the case of the related art, determined from motion information on pixels contained in lines above and below the interpolation pixel in the same field, and the presence or absence of motion of the interpolation pixel is also determined from motion information on pixels contained in the previous and next fields at the same position as the interpolation pixel, whereby it is possible to detect motions in fields between frames without incurring new erroneous detection. However, this construction is, as shown in FIGS. 14H to 15Q mentioned above, incapable of accurately detecting motions in fields between frames if motion information to be referred to is erroneous information.

Figure 14H:
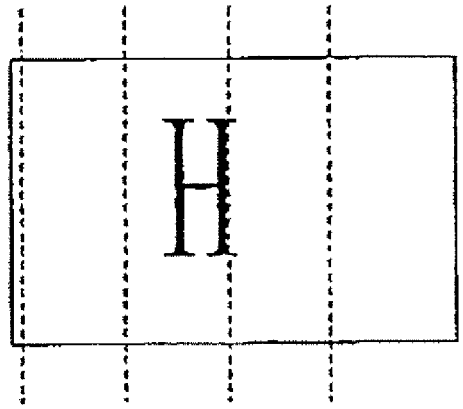
FIGS. 14H to 14K are views showing an example in which the letter "H" is displayed while travelling in the horizontal direction from right to left.
Figure 14I:
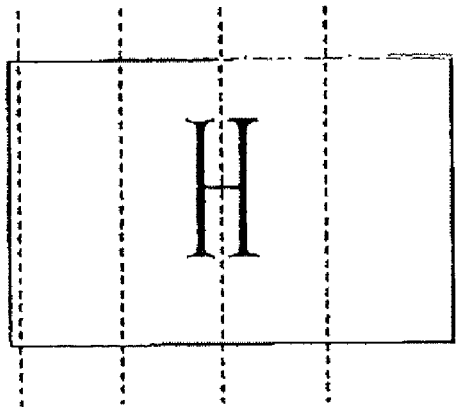
Figure 14J:
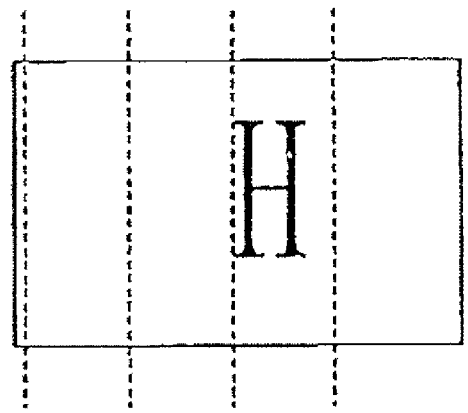
Figure 14K:
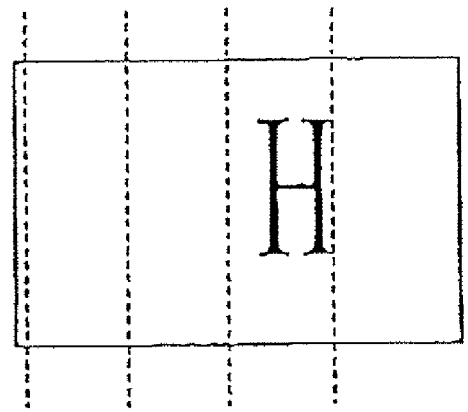
Figure 15M:
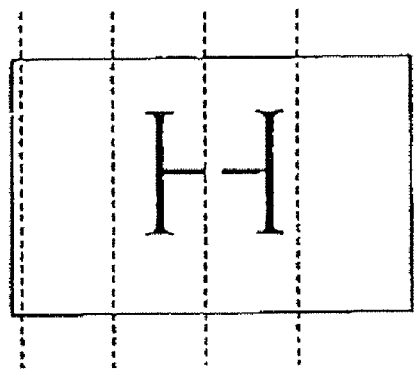
Figure 15N:
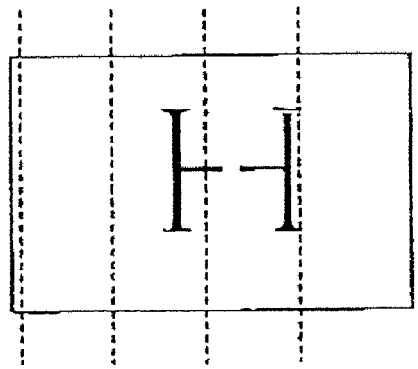
Figure 15P:
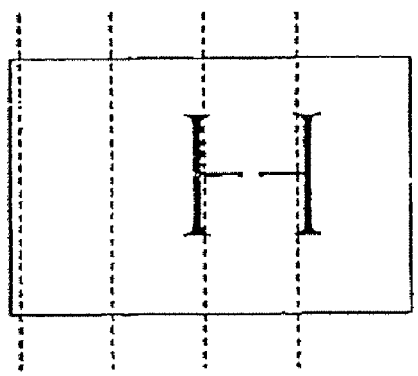
Figure 15Q:
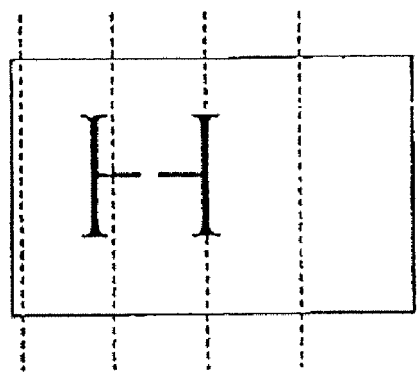

FIGS. 14H to 14*k* and 15M to 15Q show an example of erroneous detection in which when motion information indicative of a moving image in a field of interest is the same as pixel information on the previous frame, a portion from which motion information indicative of a moving image should be originally found is detected as motion information indicative of a still image. This erroneous detection cannot be solved even if the presence or absence of motion of an interpolation pixel is determined from the interpolation pixel and motion information on pixels contained in the previous and next fields at the same position as the interpolation pixel. Namely, in this erroneous detection, an overlap of letters occurs in the state shown in FIG. 15M, and motion information on a portion which is not handled as a moving image is detected as moving-image information in the previous and next frames as shown in FIGS. 15P and 15Q.

Accordingly, when motion information on a pixel to be referred to is to be determined, motion information on the previous and next frames is also referred to, and if the motion information on the pixel to be referred to is a still image and motion information on pixels contained at the same position as the pixel in the previous and next frames is a moving image, the motion information on the pixel is handled as moving-image information, whereby the erroneous detection shown in FIGS. 14H to 15Q can be prevented.

In the second embodiment, when motion information on a pixel to be interpolated is to be determined, first, the presence or absence of motion of a pixel to be referred to is determined from an interframe difference signal as in the case of the related art, and the presence or absence of motion of the reference pixel is also determined from motion information on pixels contained in the previous and next frames at the same position as the reference pixel. After that, the presence or absence of motion of an interpolation pixel is determined from motion information on pixels contained in lines above and below in the same field as the interpolation pixel and from motion information on pixels contained in the previous and next frames at the same position as the interpolation pixel.

Figure 5:
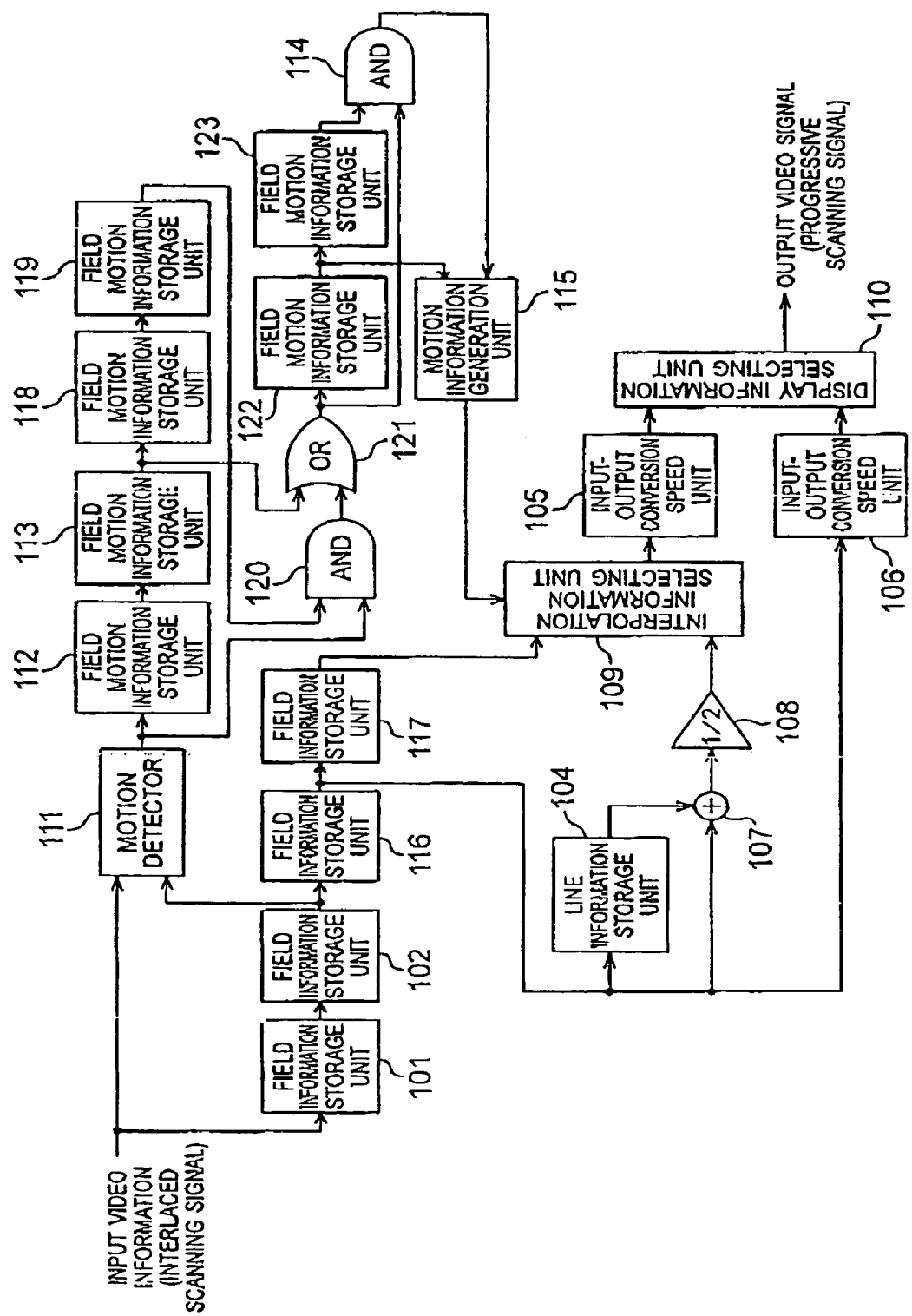
FIG. 5 is a block diagram showing the construction of an IP conversion processing circuit according to a second embodiment.

FIG. 5 is a block diagram showing the construction of an IP conversion processing circuit according to the second embodiment. As compared with the above-mentioned first embodiment, the IP conversion processing circuit according to the second embodiment further includes a field information storage unit 116 which stores in units of fields video information outputted from the field information storage unit 102, a field information storage unit 117 which stores in units of fields video information outputted from the field information storage unit 116, a field motion information storage unit 118 which stores in units of fields video information outputted from the field motion information storage unit 113, a field motion information storage unit 119 which stores in units of fields video information outputted from this field motion information storage unit 118, a two-input one-output AND device 120 which finds the logical product of motion information outputted from the motion detector 111 and motion information outputted from the field motion information storage unit 119, a two-input one-output OR device 121 which finds the logical sum of motion information outputted from this AND device 120 and motion information outputted from the field motion information storage unit 113, a field motion information storage unit 122 which stores in units of fields motion information outputted from this OR device 121, and a field motion information storage unit 123 which stores in units of fields motion information outputted from this field motion information storage unit 122.

The operation of the IP conversion processing circuit having the above-mentioned construction will be described below.

The motion detector 111 finds motion information on an inputted field by comparing inputted video information and video information which is outputted from the field information storage unit 102 and is delayed by one frame period from the inputted video information.

The motion information found by the motion detector 111 is stored in units of fields into the field motion information storage unit 112, the field motion information storage unit 113, the field motion information storage unit 118 and the field motion information storage unit 119 in named order. Consequently, motion information on a field which is one field period previous to the inputted field is outputted from each of the field motion information storage unit 112, the field motion information storage unit 113, the field motion information storage unit 118 and the field motion information storage unit 119.

Figure 6:
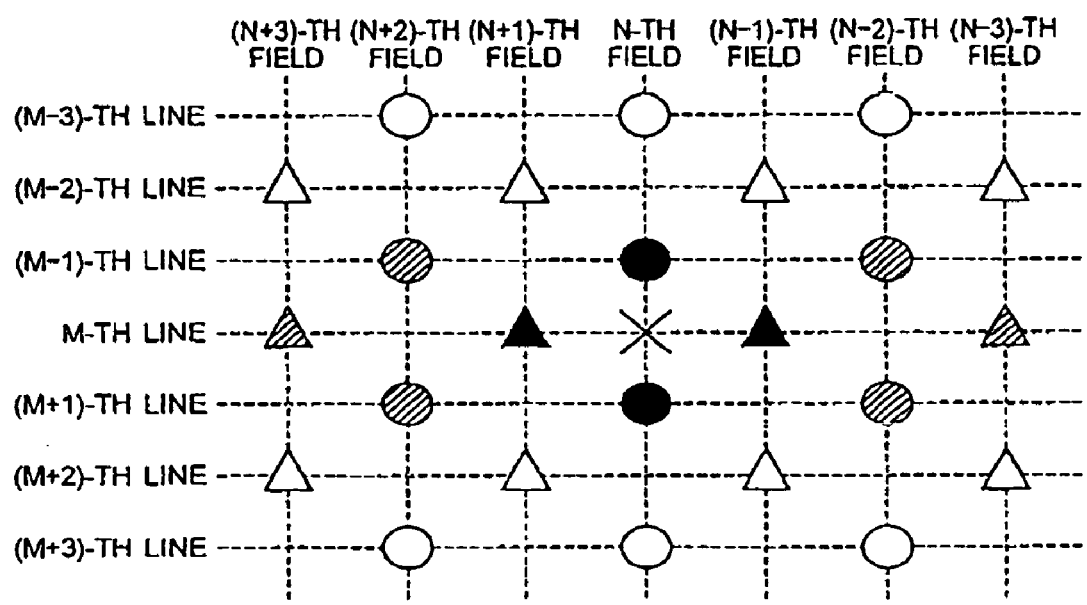
FIG. 6 is a view showing the relationship between the position of a pixel to be interpolated and the positions of pixels which neighbor the position of the interpolation pixel, as well as the positions of Pixels which are contained in a plurality of previous and next fields.

FIG. 6 is a view showing the relationship between the position of a pixel to be interpolated and the positions of pixels which neighbor the position of the interpolation pixel, as well as the positions of pixels which are contained in a plurality of previous and next fields. In FIG. 6, the pixels which neighbor the position of the interpolation pixel and the pixels which are contained in the plurality of previous and next fields have motion information to be referred to for the purposes of determining the motion of the interpolation pixel. In FIG. 6, the hatched symbols "○", the symbols "●" and the outline symbols "○" denote input pixels of odd fields. The hatched symbols "Δ", the symbols "▲" and the outline symbols "Δ" denote input pixels of even fields. "x" denotes a pixel of interest to be interpolated. The symbols "●" denote pixels having motion information to be referred to when the motion of the pixel of interest to be interpolated is to be determined. The symbols "▲" denote pixels having motion information to be referred to when the motion of the pixel of interest to be interpolated is to be determined, or pixels to be referred to during the application of correction to a pixel whose motion information is to be referred to when the motion of the pixel of interest to be interpolated is to be determined. The hatched symbols "○" and the hatched symbols "Δ" are pixels to be referred to during the application of correction to a pixel whose motion information is to be referred to when the motion of the pixel of interest to be interpolated is to be determined.

In the second embodiment, when the motion of the interpolation pixel is to be determined, the motion of the interpolation pixel is, as in the case of the first embodiment, determined from motion information on pixels contained in lines above and below the interpolation pixel in the same field, as well as from motion information on pixels contained in the previous and next fields at the same position as the interpolation pixel. Furthermore, when the motion of the interpolation pixel is to be determined, motion information on a pixel to be referred to is determined from an interframe difference signal as in the case of the related art, and motion information on the reference pixel is also determined from motion information on pixels contained in the previous and next frames. Namely, in FIG. 5, the (n+3)-th field of video information is inputted, and the motion detector 111 finds motion information on the pixels contained in the (n+3)-th field from the inputted (n+3)-th field of video information and from the (n+1)-th field of video information outputted from the field information storage unit 102.

In addition, motion information on the pixels of the (n+2)-th field which has previously been found by the motion detector 111 is outputted from the field motion information storage unit 112, and further, motion information on the pixels of the (n+1)-th field which is one field previous is outputted from the field motion information storage unit 113. Similarly, motion information on the pixels of the n-th field and motion information on the pixels of the (n−1)-th field are respectively outputted from the field motion information storage unit 118 and the field motion information storage unit 119.

In addition, the OR device 121 finds the logical sum of the motion information on the pixels of the (n+1)-th field which is outputted from the field motion information storage unit 113, and motion information on the previous and next frames. As the motion information on the previous and next frames, the AND device 120 finds the logical product of the motion information on the pixels of the (n+3)-th field which is outputted from the motion detector 111 and the motion information on the pixels of the (n−1)-th field which is outputted from the field motion information storage unit 119. Namely, the motion information on the pixels of the (n+1)-th field is determined by the OR device 121 from the motion information found from the interframe difference signal by the motion detector 111, and from motion information indicative of a moving image which is outputted from the AND device 120 when it is determined that the motion information on both the previous and next frames are moving-image information.

Motion information on a pixel positioned on the m-th line of the (n+1)-th field to be referred to for the purposes of finding motion information on the interpolation pixel positioned on the m-th line of the n-th field is found by the motion detector 111 from difference information between the pixel value of the pixel positioned on the m-th line of the (n+1)-th field and the pixel value of the pixel positioned on the m-th line of the (n−1)-th field, and after the found motion information has been stored in the field motion information storage unit 112 and the field motion information storage unit 113, the found motion information is outputted from the field motion information storage unit 113.

The AND device 120 finds information indicative of the logical product of the motion information on the pixel positioned on the m-th line of the (n+3)-th field which is outputted from the motion detector 111 and the motion information on the pixel positioned on the m-th line of the (n−1)-th field which is outputted from the field motion information storage unit 119, and output the information indicative of the logical product.

The motion information on the pixels of the (n+1)-th field which has been found from the interframe difference signal by the motion detector 111 and is outputted from the field motion information storage unit 113, and the motion information on the pixels of the (n+1)-th field which has been found from the motion information on the previous and next frames by the AND device 120, are inputted to the OR device 121. If the OR device 121 determines that either one of the former and latter motion information is moving-image information, the OR device 121 outputs motion information indicative of a moving image, and otherwise, outputs motion information indicative of a still image. The motion information generated by the OR device 121 is stored in units of fields into the field motion information storage unit 122 and the field motion information storage unit 123 in named order. Consequently, the motion information on the pixels of the n-th field and the motion information on the pixels of the (n−1)-th field are respectively outputted from the field motion information storage unit 122 and the field motion information storage unit 123.

The motion information outputted from the field motion information storage unit 122 and the field motion information storage unit 123 are motion information which are determined by referring to not only the motion information found from the interframe difference signal by the motion detector 111 but also the motion information on the previous and next frames.

The motion information which are outputted from the OR device 121, the field motion information storage unit 122 and the field motion information storage unit 123 are processed in a manner similar to that used in the above-mentioned first embodiment. Namely, the motion information on the pixels of the (n+1)-th field which is outputted from the OR device 121 and the motion information on the pixels of the (n−1)-th field which is outputted from the field motion information storage unit 123 are inputted to the AND device 114, and the AND device 114 finds information indicative of the logical product of the motion information on these pixels. In FIG. 6, since the motion information on the interpolation pixel positioned on the m-th line of the n-th field is found, the information indicative of the logical product of the motion information on the pixel positioned on the m-th line of the (n+1)-th field and the motion information on the pixel positioned on the m-th line of the (n−1)-th field are outputted from the AND device 114.

The motion information generation unit 115 determines final motion information on the interpolation pixel from the motion information on the n-th field outputted from the field motion information storage unit 112 and the motion information on the n-th field outputted from the AND device 114. Namely, as shown in FIG. 3 mentioned above in the first embodiment, the motion information generation unit 115 finds the logical sum of the motion information on the interpolation pixel which is found from the motion information on the pixels positioned in the fields previous and next to the pixel to be interpolated and is outputted from the AND device 114, and the motion information on the pixels positioned on the lines above and below the pixel to be interpolated in the same field and is outputted from the field motion information storage unit 122, and the found logical sum is outputted from the motion information generation unit 115 as the final motion information on the interpolation pixel of the n-th field. Namely, if it is determined that either of the motion information outputted from the AND device 114 and the motion information on the pixels which is positioned on the lines above and below the pixel to be interpolated in the same field and is outputted from the field motion information storage unit 122 is moving-image information, the motion information generation unit 115 outputs motion information indicative of a moving image, and otherwise, outputs motion information indicative of a still image.

In the second embodiment, since the (n+3)-th field of video information is obtained from the inputted video information and the motion information on the interpolation pixel of the n-th field is outputted from the motion information generation unit 115, the pixel information on the (n−1)-th field which is outputted from the field information storage unit 117 is inputted to the interpolation information selecting unit 109 as the pixel information which was inputted one field period previously to the field to be interpolated. In addition, in order to obtain from the divider 108 an average value of the pixel values on the lines above and below the interpolation pixel position, the pixel information on the n-th field which is outputted from the field information storage unit 116 is inputted to the line information storage unit 104 and to the adder 107. In addition, the pixel information on the n-th field which is outputted from the field information storage unit 116 is inputted to the input-output conversion speed unit 106.

The interpolation information selecting unit 109 selects, according to the motion information on the interpolation pixel which is outputted from the motion information generation unit 115, either the pixel information on the (n−1)-th field which is outputted from the field information storage unit 117, or the average value of the pixel values contained in the lines above and below the interpolation pixel position, which average value is outputted from the divider 108, and outputs the selected one to the input-output conversion speed unit 105.

The pixel information inputted to the input-output conversion speed unit 105 and the pixel information inputted to the input-output conversion speed unit 106 are read out at speeds twice their input speeds, respectively. The display information selecting unit 110 effects line-by-line switching between the pixel information outputted from the input-output conversion speed unit 105 and the pixel information outputted from the input-output conversion speed unit 106, and outputs the resultant pixel information as a progressive video signal.

Figure 7:
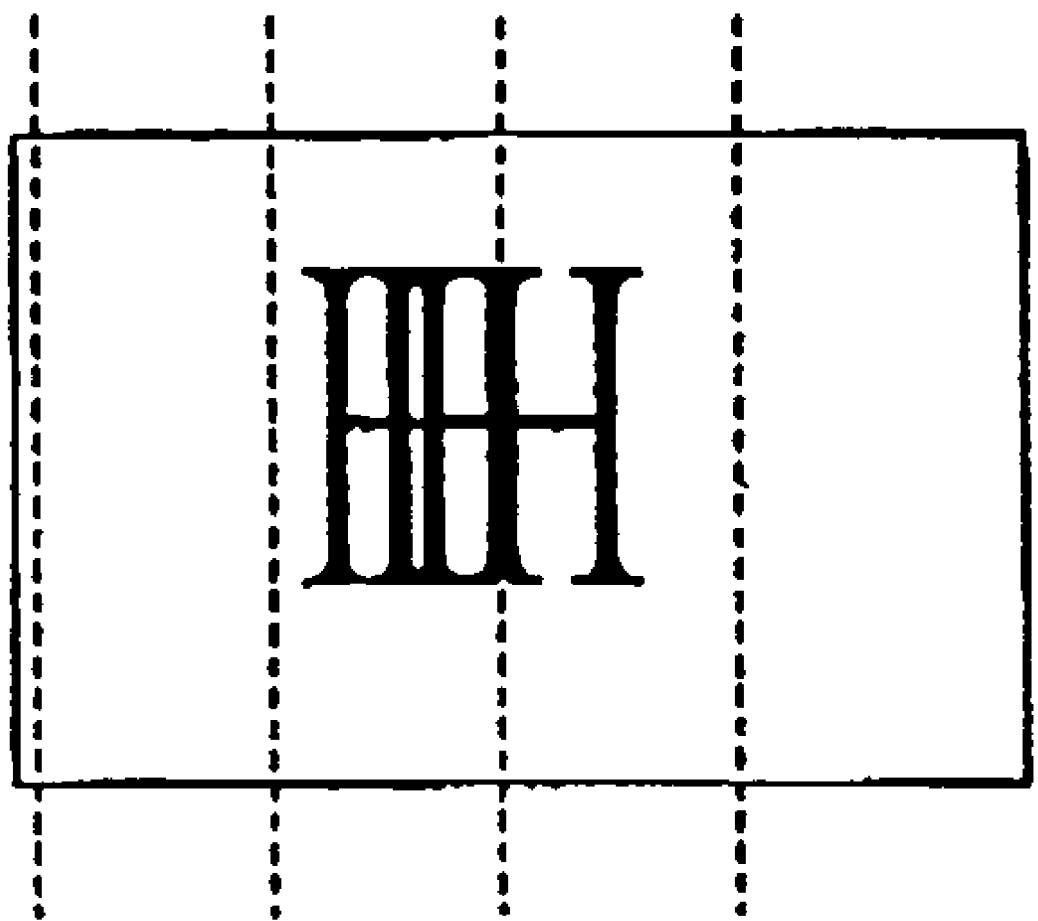
FIG. 7 is a view showing motion information on a field of interest.

FIG. 7 is a view showing motion information on a field of interest. In FIG. 7, the state of motion of each of the fields shown in FIGS. 14H, 14I and 14J is accurately obtained as motion information on a field similar to that shown in FIG. 14H mentioned above.

According to the second embodiment, when motion information on a pixel to be interpolated is to be determined, the presence or absence of motion of the interpolation pixel is, as in the case of the related art, determined from motion information on pixels contained in lines above and below the interpolation pixel in the same field, and the presence or absence of motion of the interpolation pixel is also determined from motion information on pixels contained in the previous and next fields at the same position as the interpolation pixel. Furthermore, when the motion information on the pixel to be interpolated is to be determined, reference is made to motion information on pixels contained at the same position as a pixel to be referred to, in frames previous and next to the reference pixel.

Accordingly, it is possible to prevent erroneous detection in which when pixel information on a moving image is the same as pixel information on the previous frame, a portion from which motion information indicative of a moving image should be originally found is detected as motion information indicative of a still image as shown in FIGS. 14H to 15Q, and it is possible to accurately detect motions in fields between frames such as those shown in FIGS. 12A to 13G.

In the second embodiment, the motion information found by the motion detector 111 is stored in units of fields in the field motion information storage unit 112, the field motion information storage unit 113, the field motion information storage unit 118 and field motion information storage unit 119 in named order, and the motion information found by the OR device 121 is stored in units of fields in the field motion information storage unit 122 and the field motion information storage unit 123 in named order, whereby motion information on a plurality of fields are obtained at the same time. However, instead of the field motion information storage unit 112, the field motion information storage unit 113, the field motion information storage unit 118, the field motion information storage unit 119, the field motion information storage unit 122 and the field motion information storage unit 123, a plurality of field information storage units and motion detectors may also be provided so that the necessary motion information on a plurality of fields can be found at each time.

Third Embodiment

In the first embodiment, when motion information on a pixel to be interpolated is to be determined, the presence or absence of motion of the interpolation pixel is, as in the case of the related art, determined from motion information on pixels contained in lines above and below the interpolation pixel in the same field, and the presence or absence of motion of the interpolation pixel is also determined from motion information on pixels contained in the previous and next fields at the same position as the interpolation pixel. Furthermore, in the second embodiment, when motion information on a pixel to be referred to is to be determined, motion information on the reference pixel is determined from an interframe difference signal as in the case of the related art, and motion information on the reference pixel is also determined from motion information on pixels contained in the previous and next frames at the same position as the reference pixel.

Accordingly, it is possible to prevent erroneous detection of motion information on a pixel which occurs when motion information is found from an interframe difference signal as in the case of the related art. Namely, it is possible to prevent erroneous detection in which, as shown in FIGS. 12A to 13G, motions in fields between frames cannot be detected, and erroneous detection in which, as shown in FIGS. 14H to 15Q, when pixel information on a moving image is the same as pixel information on the previous frame, a portion from which motion information indicative of a moving image should be originally found is detected as motion information indicative of a still image.

Since the thus-obtained accurate motion information free of erroneous detection is further stored for a plurality of field periods and is combined with motion information on a plurality of fields, it is possible to positively obtain the above-mentioned advantage, as compared with the case where motion information on a plurality of fields which contain erroneous detection information obtained from an interframe difference signal are combined.

For example, the above-mentioned JP-A-10-98692 discloses that the influence of noise is reduced by referring to motion information on a previous frame as well as motion information on a field of interest. However, as compared with this method of finding new motion information on a field of interest from motion information on a field of interest obtained from an interframe difference signal and from motion information on the previous frame, the method of finding new motion information on a field of interest by using motion information and motion information on the previous frame obtained by storing the motion information in units of a plurality of fields as mentioned above in the first embodiment and the second embodiment is capable of far more positively eliminating the influence of noise, because erroneous detection information is not contained in motion information to be referred to.

In the third embodiment, in order that the motion information obtained in the second embodiment be stored for a plurality of field periods and be combined with motion information on a plurality of fields to generate new motion information, a storage unit is provided for storing the motion information obtained in the second embodiment for one frame period, so that new motion information on a interpolation pixel is generated from the motion information obtained in the second embodiment and from the motion information on the previous frame obtained from the storage unit.

Figure 8:
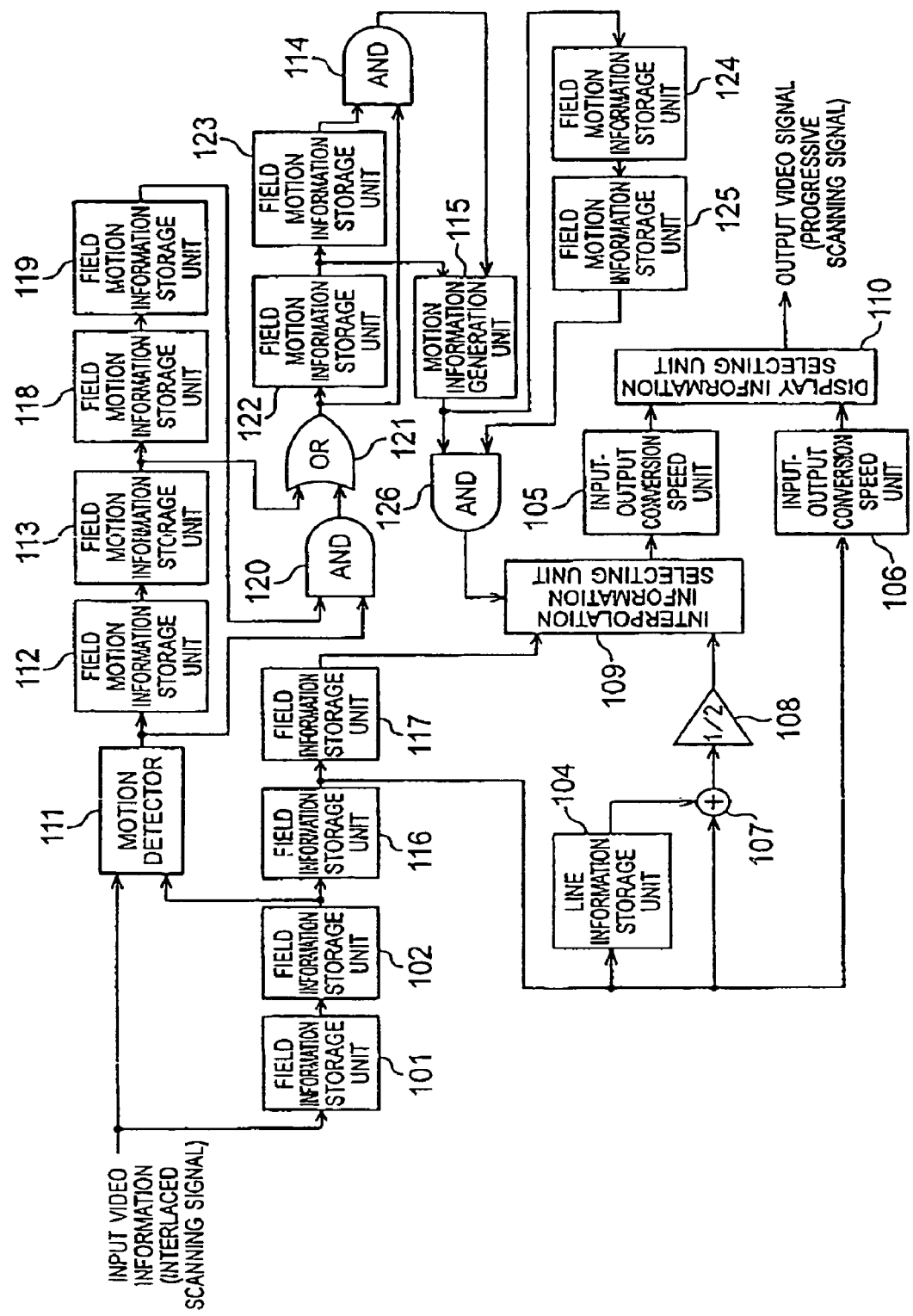
FIG. 8 is a block diagram showing the construction of an IP conversion processing circuit according to a third embodiment.

FIG. 8 is a block diagram showing the construction of an IP conversion processing circuit according to the third embodiment. As compared with the IP conversion processing circuit according to the second embodiment (refer to FIG. 5), the IP conversion processing circuit according to the third embodiment further includes a field motion information storage unit 124 which stores in units of fields motion information outputted from the motion information generation unit 115, a field motion information storage unit 125 which stores in units of fields motion information outputted from the field motion information storage unit 124, and a two-input one-output AND device 126 which finds the logical product of motion information outputted from the motion information generation unit 115 and motion information outputted from the field motion information storage unit 125.

The operation of the IP conversion processing circuit having the above-mentioned construction will be described below.

As mentioned above in the description of the second embodiment, the motion information generation unit 115 outputs motion information on an interpolation pixel which has not only motion information found from an interframe difference signal but also motion information determined by referring to motion information on pixels positioned at the same position in the previous and next frames, and which is found from motion information on pixels contained in lines above and below the interpolation pixel in the same field and from motion information on pixels contained in the previous and next fields at the same position as the interpolation pixel.

The motion information outputted from the motion information generation unit 115 is stored in units of fields into the field motion information storage unit 124 and the field motion information storage unit 125. Consequently, each of the field motion information storage unit 124 and the field motion information storage unit 125 outputs motion information on a field which is one field period previous to the inputted field.

The motion information outputted from the motion information generation unit 115, and the motion information on the field which is one frame period previous to the motion information outputted from the motion information generation unit 115 and is outputted from the field motion information storage unit 125, are respectively inputted to the AND device 126, and the AND device 126 finds information indicative of the logical product of the former and latter motion information. Namely, if the motion information outputted from the motion information generation unit 115 is the value "1" and the motion information outputted from the field motion information storage unit 125 is the value "1", it is determined that a motion of that pixel has occurred, and the value "1" is outputted from the AND device 126. Accordingly, even if motion information indicative of a moving image is outputted from the motion information generation unit 115, motion information indicative of a moving image is outputted from the AND device 126 when a display state which is one frame period previous is a still image.

The pixel information outputted from the field information storage unit 117 is inputted to the interpolation information selecting unit 109 as pixel information which was inputted one field period previously to the field to be interpolated. In addition, in order to obtain from the divider 108 an average value of the pixel values on the lines above and below the interpolation pixel position, the pixel information outputted from the field information storage unit 116 is inputted to the line information storage unit 104 and to the adder 107. In addition, the pixel information outputted from the field information storage unit 116 is inputted to the input-output conversion speed unit 106.

The interpolation information selecting unit 109 selects, according to the motion information on the interpolation pixel which is outputted from the AND device 126, either one of the pixel information which is outputted from the field information storage unit 117 and was inputted one field period previous and the average value of the pixel values on the lines above and below the interpolation pixel position which is outputted from the divider 108, and outputs the selected one to the input-output conversion speed unit 105.

The pixel information which have been inputted to the input-output conversion speed unit 105 and the input-output conversion speed unit 106 are read out at speeds twice their input speeds, respectively. The display information selecting unit 110 effects line-by-line switching between the pixel information outputted from the input-output conversion speed unit 105 and the pixel information outputted from the input-output conversion speed unit 106, and outputs the resultant pixel information as a progressive video signal In the third embodiment, the information indicative of the logical product of the motion information outputted from the motion information generation unit 115 and the motion information on the field which is one frame period previous to the motion information outputted from the motion information generation unit 115 and is outputted from the field motion information storage unit 125 is obtained from the AND device 126 as new motion information. Accordingly, even if a pixel value is instantaneously varied by an external cause such as noise, the influence of the varied pixel value can be eliminated.

However, this method is incapable of determining whether a variation in a pixel value which instantaneously occurs is due to an external cause such as noise or an actual variation in a video image, and is likely to incur erroneous detection. To cope with this disadvantage, as another example of the method of further storing the motion information obtained in the second embodiment for a plurality of field periods and combining the stored motion information with motion information on a plurality of fields to generate new motion information, it is possible to adopt a method of preferentially generating a moving image by using an OR device in place of an AND device, or a method such as that carried out when motion information on a reference pixel is to be determined in the second embodiment, that is, a method of referring to motion information on the previous and next frames and forcedly modifying motion information on a field of interest into motion information indicative of a moving image.

According to the third embodiment, since the motion information obtained in the second embodiment is stored for a plurality of field periods and is combined with motion information on a plurality of fields to generate new motion information, it is possible to positively eliminate the influence of an instantaneous variation in a pixel value due to an external cause such as noise.

In the third embodiment, the motion information found by the motion detector 111 is stored in units of fields into the field motion information storage unit 112, the field motion information storage unit 113, the field motion information storage unit 118 and the field motion information storage unit 119, the motion information found by the OR device 121 is stored in units of fields into the field motion information storage unit 122 and the field motion information storage unit 123, and the motion information found by the motion information generation unit 115 is stored in units of fields into the field motion information storage unit 124 and the field motion information storage unit 125, whereby motion information on a plurality of fields are obtained at the same time. However, instead of the field motion information storage unit 112, the field motion information storage unit 113, the field motion information storage unit 118, the field motion information storage unit 119, the field motion information storage unit 122, the field motion information storage unit 123, the field motion information storage unit 124 and the field motion information storage unit 125, a plurality of field motion information storage units and motion detectors may be provided so that motion information on a plurality of fields can be found at each time.

Although the preferred embodiments of the invention have been described above, the invention is not limited to any of the constructions of these embodiments, and can be applied to any construction that can achieve any of functions defined by the appended claims or the function of any of the embodiments.

According to the invention, it is possible to detect motion information on fields between frames without incurring new erroneous detection, and furthermore, even if pixel information on a moving image is the same as pixel information on the previous frame, it is possible to prevent erroneous detection in which a portion which should be originally processed as a moving image is processed as a still image, whereby it is possible to make an accurate decision as to motion.

Namely, it is possible to detect motion on fields between frames which has been incapable of being detected from motion information found from an interframe difference signal. It is possible to prevent erroneous detection which has occurred in motion information found from an interframe difference signal in the related art, that is to say, erroneous detection in which when pixel information on a moving image is the same as pixel information on the previous frame, a portion from which motion information indicative of a moving image should be originally found is detected as motion information indicative of a still image. Furthermore, it is possible to positively eliminate the influence of an instantaneous variation in a pixel value due to an external cause such as noise.

What is claimed is:

1. A video information processing apparatus configured to convert interlaced video information into progressive video information, comprising:

a pixel value information storing unit for storing inputted pixel value information on reference pixels on interlaced lines in each of a plurality of fields;

a reference pixel motion information generating unit for generating motion information on each reference pixel which indicates whether a reference pixel is a moving image or a still image at least based on difference between the pixel value information on two reference pixels at the same position in different fields;

a reference pixel motion information storing unit for storing the motion information on each reference pixel generated by the reference pixel motion information generating unit for a plurality of fields; and an interpolation pixel motion determining unit for determining whether motion information on an interpolation pixel on a line between two interlaced lines is a moving image or a still image based on the motion information on reference pixels stored in said reference pixel motion information storing unit, wherein the reference pixel motion information generating unit determines the motion information on the reference pixel in an n-th field as a moving image when a difference of the pixel value information between the reference pixel in the n-th field and the reference pixel at the same position in the (n−2)-th field is larger than a predetermined value, and, otherwise, determines the motion information on the reference pixel in the n-th field as a still image, and wherein the interpolation pixel motion determining unit is adapted to determine the motion information on the interpolation pixel in the n-th field as a moving image when the motion information on the reference pixel adjacent to the interpolation pixel on a line above or below the interpolation pixel in the n-th field indicates a moving image, or when both of the motion information on the reference pixel in the (n−1)-th field and the motion information on the reference pixel in the (n+1)-th field indicate a moving image, the reference pixels in the (n−1)-th field and the (n+1)-th field being at the same position as the interpolation pixel in the n-th field, and, otherwise, to determine the motion information on the interpolation pixel in the n-th field as a still image.

2. A video information processing apparatus according to claim 1, further comprising:

an interpolation pixel value information generating unit for generating pixel value information on the interpolation pixel in the n-th field based on the pixel value information on a reference pixel in the (n−1)-th field when the motion information on the interpolation pixel in the n-th field is determined as a still image by the interpolation pixel motion determining unit, and for generating pixel value information on the interpolation pixel in the n-th field based on the pixel value information on reference pixels in the n-th field when the motion information on the interpolation pixel in the n-th field is determined as a moving image by the interpolation pixel motion determining unit.

3. A video information processing method for converting interlaced video information into progressive video information, said method comprising:

a pixel value information storing step of storing inputted pixel value information on reference pixels on interlaced lines in each of a plurality of fields;

a reference pixel motion information generating step of generating motion information on each reference pixel which indicates whether a reference pixel is a moving image or a still image at least based on difference between the pixel value information on two reference pixels at the same position in different fields;

a reference pixel motion information storing step of storing the motion information on each reference pixel generated in the reference pixel motion information generating step for a plurality of fields; and an interpolation pixel motion determining step of determining whether motion information on an interpolation pixel on a line between two interlaced lines is a moving image or a still image based on the motion information on reference pixels stored in the interpolation pixel motion determining step, wherein the reference pixel motion information generating step determines the motion information on the reference pixel in an n-th field as a moving image when a difference of the pixel value information between the reference pixel in the n-th field and the reference pixel at the same position in the (n−2)-th field is larger than a predetermined value, and, otherwise, determines the motion information on the reference pixel in the n-th field as a still image, and wherein the interpolation pixel motion determining step comprises the steps of determining the motion information on the interpolation pixel in the n-th field as a moving image when the motion information on the reference pixel adjacent to the interpolation pixel on a line above or below the interpolation pixel in the n-th field indicates a moving image, or when both of the motion information on the reference pixel in the (n−1)-th field and the motion information on the reference pixel in the (n+1)-th field indicate a moving image, the reference pixels in the (n−1)-th field and the (n+1)-th field being at the same position as the interpolation pixel in the n-th field, and, otherwise, determining the motion information on the interpolation pixel in the n-th field as a still image.

4. A video information processing method according to claim 3, further comprising:

an interpolation pixel value information generating step of generating pixel value information on the interpolation pixel in the n-th field based on the pixel value information on a reference pixel in the (n−1)-th field when the motion information on the interpolation pixel in the (n−1)-th field is determined as a still image in the interpolation pixel motion determining step, and of generating pixel value information on the interpolation pixel in the n-th field based on the pixel value information on reference pixels in the n-th field when the motion information on the interpolation pixel in the n-th field is determined as a moving image in the interpolation pixel motion determining step.

\* \* \* \* \*